(12) United States Patent
Kossira et al.

(10) Patent No.: US 8,136,821 B2
(45) Date of Patent: Mar. 20, 2012

(54) METHOD FOR PRODUCING DIFFERENT VEHICLE MODELS AS WELL AS WHEEL SUSPENSION FOR A VEHICLE

(75) Inventors: Christoph Kossira, Ingolstadt (DE); Hugo Mueller, Rohrenfels-Ballersdorf (DE); Wilfried Michel, Riedenburg (DE); Karl-Heinz Meitinger, Trostberg (DE); Wolfgang Schmid, Freising (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 12/609,111

(22) Filed: Oct. 30, 2009

(65) Prior Publication Data

US 2010/0109264 A1    May 6, 2010

(30) Foreign Application Priority Data

Oct. 31, 2008    (DE) .......................... 10 2008 052 161

(51) Int. Cl.
*B60G 3/26* (2006.01)
(52) U.S. Cl. .................................................. 280/5.521
(58) Field of Classification Search ............... 280/5.521, 280/5.52, 86.751, 86.757, 124.134, 124.135, 280/124.128, 124.15
See application file for complete search history.

(56) References Cited

U.S. PATENT DOCUMENTS

| | | | |
|---|---|---|---|
| 7,367,607 B2 | 5/2008 | Roeder et al. | |
| 7,712,748 B2 * | 5/2010 | Deal et al. | 280/5.521 |
| 2002/0036385 A1 | 3/2002 | Mackle et al. | |
| 2010/0078910 A1 * | 4/2010 | Mueller et al. | 280/93.503 |
| 2010/0327543 A1 * | 12/2010 | Meitinger et al. | 280/5.521 |

FOREIGN PATENT DOCUMENTS

| | | |
|---|---|---|
| DE | 4010276 C2 | 9/1993 |
| DE | 19712185 C1 | 3/1998 |
| DE | 69615476 T2 | 5/2002 |
| DE | 10 2004 049296 A1 | 4/2006 |
| DE | 10 2005 023250 A1 | 11/2006 |
| DE | 202006016864 U1 | 12/2006 |
| DE | 102005033537 A1 | 1/2007 |
| DE | 102006009486 A1 | 10/2007 |
| DE | 102006055291 A1 | 6/2008 |
| DE | 102006059075 A1 | 6/2008 |
| DE | 102007013517 A1 | 9/2008 |
| GB | 2385092 | 8/2003 |
| JP | 2003118343 A | 4/2003 |
| WO | WO 98/16418 A1 | 4/1998 |
| WO | WO 2007/118629 A1 | 10/2007 |
| WO | WO 2009052914 A1 | 4/2009 |

* cited by examiner

*Primary Examiner* — Faye M. Fleming
(74) *Attorney, Agent, or Firm* — Novak Druce + Quigg LLP

(57) ABSTRACT

The invention relates to a method for producing different vehicle models in which in a comfort-oriented version a vehicle wheel is pivoted in a wheel guiding element of a wheel suspension. According to the invention, in a model with enhanced dynamics of vehicle motion, between the wheel guiding element and the vehicle wheel in the axial direction, an actuator is interposed for adjusting the camber and/or track of the vehicle wheel.

15 Claims, 2 Drawing Sheets

METHOD FOR PRODUCING DIFFERENT VEHICLE MODELS AS WELL AS WHEEL SUSPENSION FOR A VEHICLE

The invention relates to a method for producing different vehicle models of a vehicle line as well as a wheel suspension for a motor vehicle.

BACKGROUND OF THE INVENTION

In large series production of vehicles, a vehicle line comprises vehicle models with different engines and different national versions. For economic reasons such vehicle models have a common axle concept for the front and rear wheels. This means that the vehicles, regardless of country-specific requirements or the engines of the vehicle models, are equipped with identical wheel suspensions.

Thus, especially for vehicle models with small engines, ride comfort is paramount, i.e., under the action of lateral or longitudinal forces, roll steer movement of the wheel suspension takes place, as a result of which the track/camber of the vehicle wheel is adjusted. For sport models with high performance engines, conversely, higher demands with correspondingly complex, more costly chassis are imposed in terms of the dynamics of vehicle motion. For this purpose the wheel suspension is to be equipped with actuators for active adjustment of the track/camber of the vehicle wheel.

The object of the invention is to provide a method for producing vehicles and a wheel suspension for a vehicle which can be economically adapted to different requirements with respect to ride comfort and the dynamics of vehicle motion with simple modification.

SUMMARY OF THE INVENTION

According to the invention, in a comfort-oriented version of the vehicles to be produced, between the wheel guiding element of the wheel suspension in which conventionally the vehicle wheel is directly pivoted, and the vehicle wheel in the axial direction an additional actuator can be interposed for adjusting the camber and/or track of the vehicle wheel.

In vehicle models with high demands with respect to the dynamics of vehicle motion, the actuator can thus be interposed as an externally mounted part between the wheel carrier or wheel guiding element of the wheel suspension and the vehicle wheel. In this way, the track or camber of the vehicle wheel can be adjusted by triggering the actuator. Conversely, if not the dynamics of vehicle motion, but the ride comfort is paramount, the vehicle wheel is pivoted directly on the wheel carrier or wheel guiding element of the wheel suspension with omission of the actuator.

The externally mounted actuator according to the invention can be attached in the axial direction or transverse direction of the vehicle outside the wheel suspension, outside on the wheel carrier of the wheel suspension. In this way, for a basic vehicle version a simple axle construction without active track/camber adjustment can be installed. In the production of vehicles with high demands for the dynamics of vehicle motion, the externally mounted actuator can be easily mounted on the simply made comfort-oriented axle. In this case, the vehicle wheel is not supported directly in the wheel carrier but on the interposed actuator.

The actuator can, for a simple attachment into the carrier part which holds the wheel, an axle-side carrier part which is connected to the wheel suspension and into two positioning elements which can be turned to one another as well as to the wheel-side carrier part and to the axle-side carrier part around a common axis of rotation, and which interact with oblique surfaces which face one another and which are tilted by a defined angle to the axis of rotation. By way of the two positioning element for models which are demanding in terms of the dynamics of vehicle motion the wheel positions, in particular the camber and track of the wheels, can be actively set depending on the parameters of the dynamics of vehicle motion, loading state, etc. Otherwise, for smaller engines or other country-specific stipulations essentially identical wheel suspensions with fixed adapter parts of the positioning element or one-piece wheel guiding elements can be installed.

The positioning elements can be rotationally symmetrical positioning cylinders in a manner especially favorable to production engineering; of them, one is pivoted on the axle-side carrier part, and the other on the wheel-side carrier part, the two positioning cylinders being connected to one another by way of an axis of rotation which is perpendicular to the oblique surfaces.

Furthermore, the positioning elements are rotatable individually or jointly in the same or opposite direction of rotation by way of two triggerable drives which are located on the axle-side carrier part or on the wheel-side carrier part. Thus, it is possible in a structurally simple and especially durable construction to pivot or set the wheels within the scope of the positioning paths dictated by the tilt of the oblique surfaces similarly to a ball joint adjustment into all degrees of freedom and thus to ensure especially stable wheel guide positions.

The drives of the positioning elements can preferably be electric motors which act directly or indirectly by way of gearing on the positioning elements. In a direct arrangement, the positioning elements can at the same time bear the rotors of the electric motors or can form a structural unit with them.

In order to ensure smooth adjustment of positioning elements, the stop faces adjacent to one another between the wheel-side carrier part, the axle-side carrier part and the positioning elements and/or the adjacent oblique surfaces of the positioning elements can be supported by way of axial anti-friction bearings.

As mentioned above, in the comfort-oriented vehicle version the vehicle wheel can be pivoted directly in the wheel carrier or wheel guiding element, while in the version with enhanced dynamics of vehicle motion an actuator is connected between the vehicle wheel and the wheel carrier. The respective wheel guiding element of the wheel suspension can be a correspondingly divided wheel carrier which is coupled to the body of the motor vehicle by way of individual connecting rods and/or suspension arms.

In another preferred application of the adjustment device the wheel guiding element can be the semi-trailing arm of a rear independent wheel suspension of the motor vehicle, whose mechanically dictated disadvantageous track and camber changes can be equalized accordingly when the wheels are deflected.

Finally, the respective wheel guiding element can also be mounted onto the longitudinal arm of a compound steering-rear axle for motor vehicles whose elastokinematic steering tendency can be changed by dedicated track steering, in particular can be designed to be understeering.

DETAILED DESCRIPTION OF THE PREFERRED EMBODIMENTS OF THE INVENTION

Figure 1:
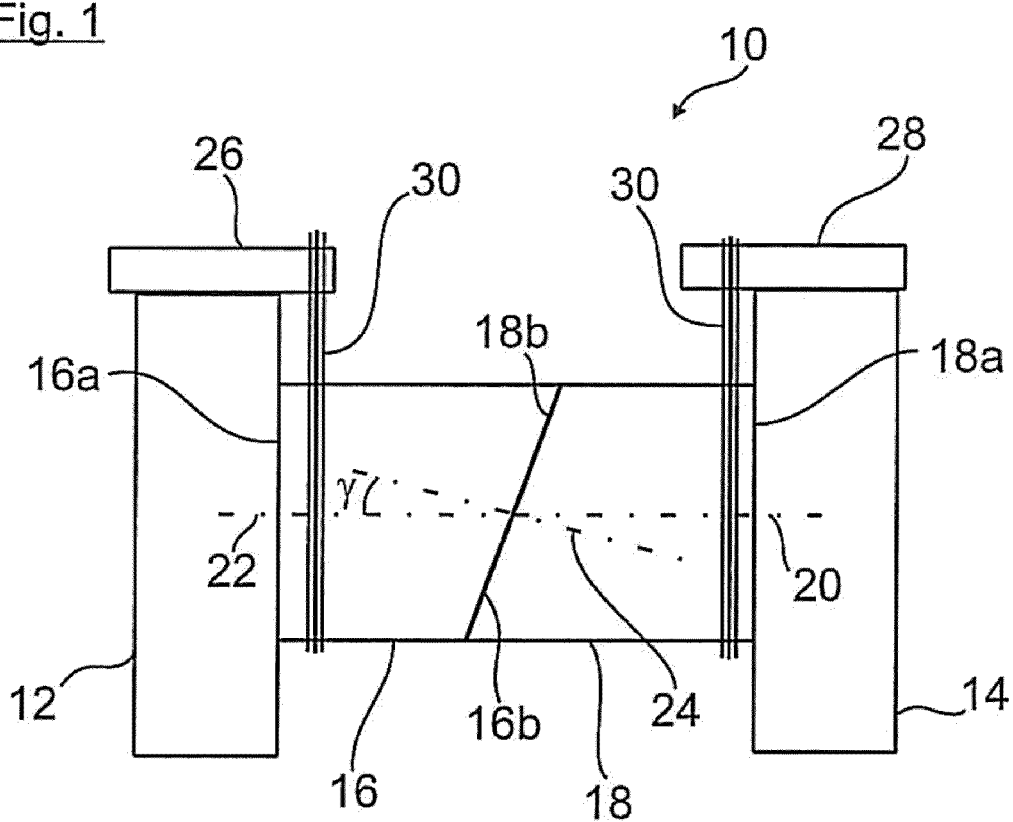
FIG. 1 shows a view of an actuator designed as an externally mounted part for adjusting the camber and the track of the wheel of a wheel suspension for motor vehicles, with a wheel-side carrier part, an axle-side carrier part and two positioning elements which are positioned in between, FIG. 2 shows in sketch form in one version of the dynamics of vehicle motion a wheel suspension with an upper and a lower suspension arm and with a wheel carrier on which there is an actuator, FIG. 3 likewise shows in sketch form a rear wheel suspension for motor vehicles, with a wheel-guiding semi-trailing arm as the wheel guiding element which is equipped corresponding to FIG. 2 with the actuator.

For a theoretical explanation of the invention FIG. 1 shows as a block diagram an actuator 10 for the wheel suspensions shown in the other figures for motor vehicles, which is divided as follows for adjusting the camber and/or the track of the wheel in the region of the wheel bearing arrangement:

The actuator 10 has a wheel-side carrier part 12 in which the wheel and the brake element (brake disk, brake drum) of the service brake of the motor vehicle is pivoted. It should be noted that to the extent not described the operating parts of the wheel suspension can be of conventional design.

Furthermore, the actuator 10 has an axle-side carrier part 14 which interacts with the wheel suspension in a manner yet to be described or forms an additional, externally mounted part of the wheel suspension.

Between the wheel-side carrier part 12 and the axle-side carrier part 14 the positioning elements are two, essentially rotationally symmetrical positioning cylinders 16, 18 which are each rotatably connected to the wheel-side carrier part 12 and the axle-side carrier part 14 by way of separate axes of rotation 20, 22. The two axes of rotation 20, 22 are coaxially aligned and run preferably in the axis of rotation of the wheel, which is not shown.

While the stop faces 16a, 18a of the positioning cylinders 16, 18, which surfaces are directly adjacent to the wheel-side carrier part 12 and the axle-side carrier part 14, are made rotationally symmetrical, the positioning cylinders 16, 18 adjoin one another by way of planar oblique surfaces 16b, 18b and are rotatably joined to one another by way of an axis of rotation 24. The axis of rotation 24 is, as is apparent, aligned perpendicular to the oblique surfaces 16b, 18b and is oriented tilted at a defined angle γ to the axes of rotation 20, 22.

The indicated axes of rotation 20, 22, 24 are formed in real terms by guide bolts (not shown) or the like, on which the positioning cylinders 16, 18 are guided positively and free of play in the axial direction. Between the stop faces 16a, 18a and the oblique surfaces 16b, 18b axial antifriction bearings are inserted and enable smooth and essentially wear-free twisting of the positioning cylinders 16, 18.

On the wheel-side carrier part 12 and the axle-side carrier part 14 there is one electric motor drive 26, 28 respectively each which is connected to the positioning cylinders 16, 18 by way of gearing 30 which is only suggested, for example a toothed belt drive. By means of the drives 26, 28 the positioning cylinders 16, 18 can be twisted at the same time or separately in both directions of rotation.

The drives 26, 28 can also be formed by electric motors (not shown) which are combined with the positioning cylinders 16, 18, the rotors of the electric motors being arranged annularly directly on the positioning cylinders 16, 18 and being surrounded by the stators which are attached to the wheel-side carrier part 12 and the axle-side carrier part 14.

Preferably, the positioning cylinders 16, 18 are driven by way of feed-back control to ensure precision adjustment of the wheel setting values depending on the parameters of the dynamics of vehicle motion, load states, etc. For this purpose the actual angle position of the positioning cylinders 16, 18 can be detected and evaluated using control engineering by way of the corresponding angle measurement means.

By twisting the two positioning cylinders 16, 18 in the same direction, the adjustment of the camber or track of the wheel supported on the carrier part 12 does not take place directly. But the oblique plane defined by the oblique surfaces 16b, 18b is "preselected", from which, with the twisting of the positioning cylinders 16, 18 which is now in the opposite direction or optionally only separate twisting of one of the positioning cylinders 16, 18, the wheel camber or wheel track or optionally both setting values are simultaneously adjusted, the carrier part 12 being pivoted accordingly relative to the guide part 14.

If, for example, the indicated oblique plane with its longitudinal extension is in horizontal alignment when the positioning cylinder 16 twists, track adjustment of the wheel takes place, while in a vertical alignment a camber adjustment is effected. In defined intermediate positions of the positioning cylinders 16, 18 the wheel track and camber can be adjusted at the same time.

Figure 2:
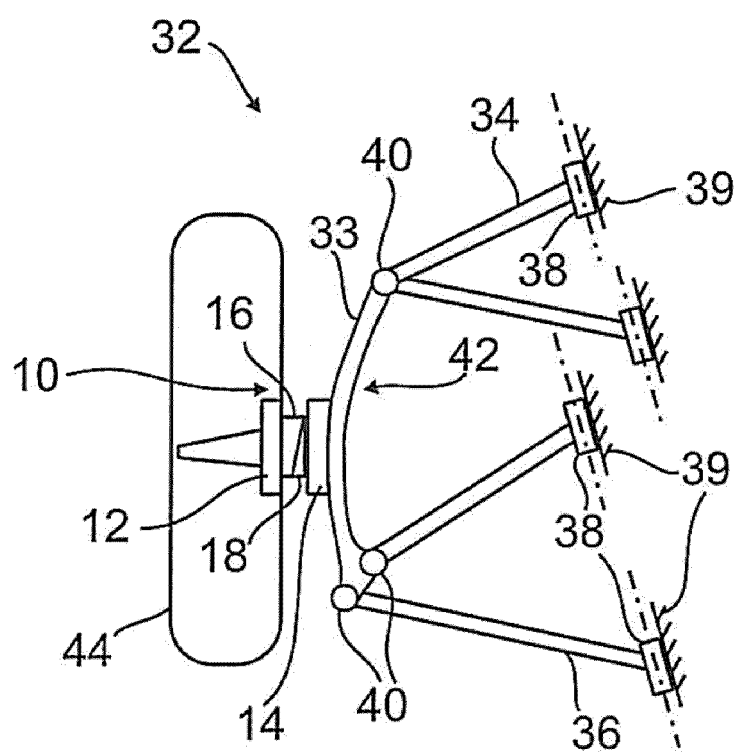

FIG. 2 shows only in sketch form the rear wheel suspension 32 for a motor vehicle on which the actuator 10 is mounted. The actuator 10 here is interposed between the wheel carrier or wheel guiding element 42 of the wheel suspension and the vehicle wheel 44. The wheel guiding element 33 is coupled to the vehicle body 39 by way of a combination of connecting rods. It has an upper suspension arm 34 and a lower suspension arm 36 which are coupled by way of swivel bearings, designated generally as 38, to the body 39 of the motor vehicle (or to an auxiliary frame) and by way of swivel bearings 40 on the wheel carrier 42 as a wheel guiding element. The wheel suspension 32 can otherwise be of known design and function. This also applies to the wheel suspensions 46, 50 which are still to be described for FIGS. 3 and 4.

The actuator 10 which is connected between the vehicle wheel 44 and wheel carrier 42 is used, as is described for FIG. 1, to adjust the camber and track of the wheel 44, and is divided into a carrier part 12 which holds the wheel, the axle-side carrier part 14 and the two rotatable arranged positioning cylinders 16, 18.

Thus, by way of the positioning cylinders 16, 18 with their drives 26, 28 construction-dictated camber changes can be equalized by way of the wheel path, and the track changes which are caused, for example, by lateral forces can be corrected. Furthermore, for example, when driving through curves, dedicated steering tendencies in driving behavior of the motor vehicle, optionally depending on the load, can be set.

Figure 3:
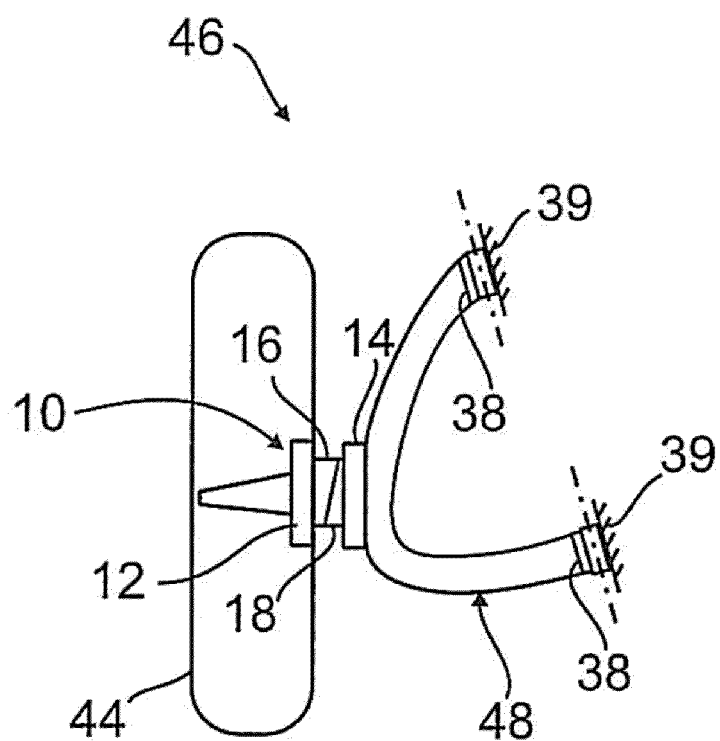

In one alternative embodiment as shown in FIG. 3 the rear wheel suspension 46 for motor vehicles is made as a semi-trailing arm axle, with one semi-trailing arm 48 as the wheel carrier or wheel guiding element which is coupled to the body 39 by way of swivel bearings 38.

The semi-trailing arm 48 in the region of the bearing arrangement of the wheel 44 is provided with an actuator 10 which is divided into a carrier part 12 which holds the wheel, a guide part 14 (here the remaining semi-trailing arm 48) and two positioning cylinders 16, 18 which are described as in FIG. 1.

In turn, construction-dictated camber values which change over the wheel path can be corrected by way of the positioning cylinders 16, 18 and the drives 26, 28 and the elastokinematic track changes of the semi-trailing arm axle 46 which are caused by lateral forces can be equalized.

Figure 4:
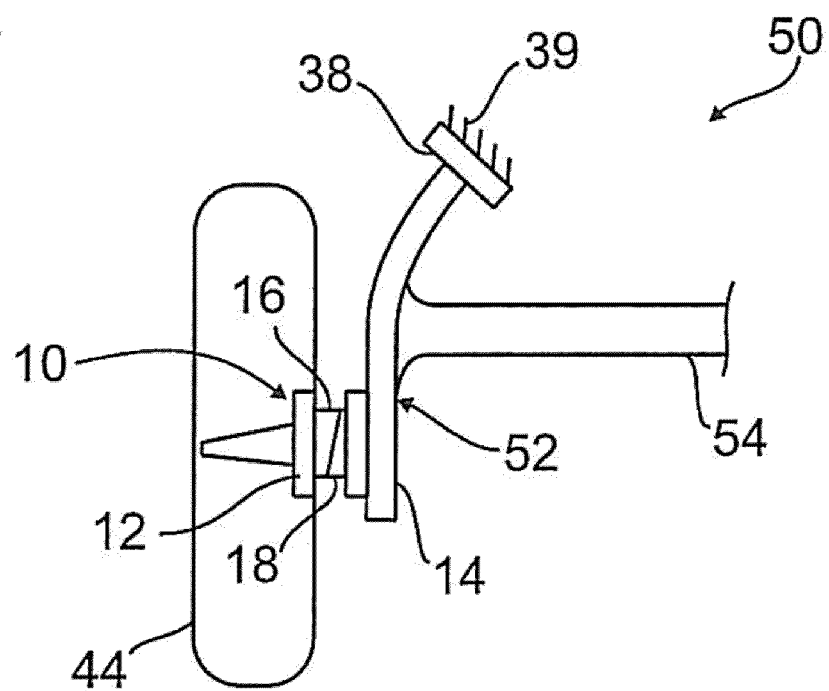
FIG. 4 shows in another sketch by way of a section a compound steering-rear axle designed likewise in a version with enhanced dynamics of vehicle motion for motor vehicles.

FIG. 4 finally shows as the rear wheel suspension 50 for motor vehicles a compound steering axle which is composed essentially of two longitudinal arms 52 (only one longitudinal arm 52 is apparent in the partial representation, the other side is mirror-symmetrically identical) and a flexurally stiff, torsionally soft transverse brace 54. The longitudinal arms 52 are connected by way of swivel bearings 38 to the body 39 of the motor vehicle.

The longitudinal arms 52 which are used as the wheel guiding element or wheel carrier are in turn as shown in FIG. 1 in the region of the wheel bearing arrangement provided with the actuator 10 which is divided into a carrier part 12, a guide part 14 which encompasses the remaining longitudinal arm 52, and the two positioning cylinders 16, 18.

By means of the positioning cylinders 16, 18 and the drives 26, 28, in particular passage into toe-out of the wheel 44 on the outside of the curve for lateral forces can be equalized by the corresponding track setting, or, if necessary, toe-in can be set for stabilization. Optionally, the driving stability can be further increased even if the camber of the wheels is set to the negative, similarly to a semi-trailing arm axle.

In addition to the described preferred embodiments as shown in FIGS. 2 to 4, the adjustment device as shown in FIG. 1 can also be used for other axle designs.

The invention claimed is:

1. A method for producing different vehicle models, in which in a comfort-oriented version a vehicle wheel is pivoted directly in a wheel guiding element of a wheel suspension wherein, a model with enhanced dynamics of vehicle motion between the wheel guiding element and the vehicle wheel in the axial direction an actuator is connected for adjusting the camber and/or track of the vehicle wheel wherein the actuator is divided into a carrier part which holds the wheel, a carrier part which is connected to the wheel suspension, and two positioning elements which are located in between and which can be turned to one another and to the carrier part and to the carrier part around a common axis of rotation and which interact with oblique surfaces which are facing one another and which are tilted by a defined angle ($\gamma$) to the axis of rotation.

2. The method according to claim 1 wherein the positioning elements are rotationally symmetrical positioning cylinders, of which one is pivoted on the wheel-side carrier part and the other on the axle-side carrier part, and that the two positioning cylinders are connected to one another by way of an axis of rotation which is perpendicular to the oblique surfaces.

3. The method according to claim 1 wherein the positioning elements can be twisted individually or jointly in the same or opposite direction of rotation by way of two drives which can be actuated and which are located on the wheel-side carrier part and on the axle-side carrier part.

4. The method according to claim 3 wherein the drives are electric motors which act directly or indirectly on the positioning elements by way of gearing.

5. The method according to claim 1 wherein mating surfaces which are adjacent to one another between the wheel-side carrier part, the axle-side carrier part and the positioning elements and/or the adjacent oblique surfaces of the positioning elements are supported by way of axial anti friction hearings.

6. The method according to claim 1 wherein the wheel guiding element of the wheel suspension is a wheel carrier which is coupled to the body of the motor vehicle by way of individual connecting rods and/or suspension arms.

7. The method according to claim 1 wherein the wheel guiding element of the wheel suspension is the semi-trailing arm of the rear independent wheel suspension of the motor vehicle.

8. The method according to claim 1 wherein the wheel guiding element is a longitudinal arm of a compound steering-rear axle for motor vehicles.

9. The method according to claim 1, wherein a wheel guiding element which is coupled by way of a combination of connecting rods to the vehicle chassis and a comfort-oriented vehicle version the vehicle wheel is directly pivoted, to provide a version with enhanced dynamics of vehicle motion between the vehicle wheel and the wheel guiding element an actuator can be interposed as an externally mounted part, with which the camber and/or track of the vehicle wheel can be adjusted.

10. The method of effecting the performance of a vehicle of a particular composition and intended performance, comprising adjusting the camber of a wheel thereof of an assembly including:
   means pivotally connectable to a body of said vehicle;
   a first carrier mounted on said pivotally connectable means;
   a wheel rotatably mounted on a second carrier;
   a first positioning member mounted on and rotational about a first axis relative to said first carrier;
   a second positioning member mounted on and rotational about a second axis relative to said second carrier, disposable coaxially with said first axis;
   said first and second positioning members having mating surfaces lying in a plane disposed at an acute angle relative to said first axis, and being pivotal about a third axis disposed perpendicular to said plane and intersecting said first axis; and
   means for rotating said second positioning means about said second axis, imparting a rotational movement of said second positioning member about said third axis.

11. The method according to claim 10 including a bearing disposed between said mating surfaces of said positioning members.

12. The method assembly according to claim 10 wherein said rotating means comprises an electric motor.

13. The method assembly according to claim 10 wherein said means connectable to said body comprises at least two suspension arms, each swivably connected to said body and said first carrier.

14. The method according to claim 10 wherein said means connectable to said body comprises a trailing suspension arm rigidly connected to said first carrier and swivably connected to said body.

15. The method according to claim 10 wherein said means connectable to said body comprises a trailing, longitudinally extending suspension arm swivably connected to said body, rigidly connected to said first carrier and rigidly connected to a transversely disposed member connectable to a similar arm disposed at an opposite side of said vehicle.

* * * * *

UNITED STATES PATENT AND TRADEMARK OFFICE
CERTIFICATE OF CORRECTION

PATENT NO.         : 8,136,821 B2
APPLICATION NO.    : 12/609111
DATED              : March 20, 2012
INVENTOR(S)        : Kossira et al.

It is certified that error appears in the above-identified patent and that said Letters Patent is hereby corrected as shown below:

Claim 1: Column 5, line 40 - 41: "... and which can be turned to one another and to the carrier part ~~and to the carrier part~~ around a common axis...."
Please delete the second "and to the carrier part.".

Signed and Sealed this
Thirty-first Day of July, 2012

David J. Kappos
*Director of the United States Patent and Trademark Office*